United States Patent
Maki et al.

(10) Patent No.: US 8,128,224 B2
(45) Date of Patent: *Mar. 6, 2012

(54) INJECTION MOLDING OF LENS

(75) Inventors: Alan D. Maki, Chaska, MN (US); Eric J. Woelfle, Princeton, MN (US); Darrell B. Kroulik, Cambridge, MN (US); Thomas J. Moravec, Maple Grove, MN (US); Edward A. Travnicek, Ramsey, MN (US); Martin L. Hage, Maple Grove, MN (US)

(73) Assignee: Insight Equity A.P.X, LP, Ramsey, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/458,255

(22) Filed: Jul. 18, 2006

(65) Prior Publication Data

US 2006/0244909 A1   Nov. 2, 2006

Related U.S. Application Data

(63) Continuation of application No. 10/389,353, filed on Mar. 13, 2003, now Pat. No. 7,077,985, and a continuation-in-part of application No. 09/854,419, filed on May 11, 2001, now abandoned, and a continuation-in-part of application No. 09/580,162, filed on May 30, 2000, now Pat. No. 6,390,621.

(60) Provisional application No. 60/364,839, filed on Mar. 13, 2002.

(51) Int. Cl.
*G02C 7/10* (2006.01)
*B32B 27/40* (2006.01)

(52) U.S. Cl. .................................... 351/163; 428/423.1

(58) Field of Classification Search .............. 428/423.1; 351/163

See application file for complete search history.

(56) References Cited

U.S. PATENT DOCUMENTS 2,443,286 A   6/1948   Weston
2,618,200 A   11/1952  Clave et al.
(Continued)

FOREIGN PATENT DOCUMENTS

AU   2003225785 B2   9/2002
(Continued)

OTHER PUBLICATIONS

United States Patent and Trademark Office, Office Action mailed Jan. 6, 2011 in U.S. Appl. No. 12/401,277, 13 pages.

(Continued)

*Primary Examiner* — Thao T. Tran
(74) *Attorney, Agent, or Firm* — Inskeep IP Group, Inc.

(57) ABSTRACT

A flat or curved photochromic laminate structure and a plastic photochromic lens blank can be produced in a simple and efficient manner from relatively low-cost polymeric sheet materials. These laminates can be used to provide goggles, face shields, windows, window coverings, skylights, and optical lenses having efficient, uniform and high quality photochromic properties. The use of a polyesterurethane as the binder for the photochromic material has been found to improve the performance of the photochromic material. There may be a desire to have a protective exterior layer (e.g., an abrasion resistant layer) in combination with the lens system, but that may be provided in various methods. In the case of using the laminate in a goggle application, the laminate may be hard coated on one or both outer surfaces with an abrasion resistant coating, antireflective coating, and/or an anti-fog hard coating.

16 Claims, 1 Drawing Sheet

U.S. PATENT DOCUMENTS

| | | |
|---|---|---|
| 3,051,054 A | 8/1962 | Crandon |
| 3,560,076 A | 2/1971 | Ceppi |
| 3,711,417 A | 1/1973 | Schuler |
| 3,786,119 A | 1/1974 | Ortlieb |
| 3,833,289 A | 9/1974 | Schuler |
| 3,846,013 A | 11/1974 | Cohen |
| 3,877,798 A | 4/1975 | Tolar et al. |
| 3,878,282 A | 4/1975 | Bonis et al. |
| 3,940,304 A | 2/1976 | Schuler |
| 3,963,679 A | 6/1976 | Ullrich et al. |
| 3,988,610 A | 10/1976 | Street |
| 3,989,676 A | 11/1976 | Gerkin et al. |
| 4,008,031 A | 2/1977 | Weber |
| 4,012,232 A | 3/1977 | Uhlmann et al. |
| 4,035,213 A | 7/1977 | Thoma et al. |
| 4,035,524 A | 7/1977 | Fritsch |
| 4,035,527 A | 7/1977 | Deeg |
| 4,046,586 A | 9/1977 | Uhlmann et al. |
| 4,085,919 A | 4/1978 | Sullivan |
| 4,091,057 A | 5/1978 | Weber |
| 4,106,861 A | 8/1978 | Brewer et al. |
| 4,160,853 A | 7/1979 | Ammons |
| 4,166,043 A | 8/1979 | Uhlmann et al. |
| 4,170,567 A | 10/1979 | Chu et al. |
| 4,211,590 A | 7/1980 | Steward et al. |
| 4,251,476 A | 2/1981 | Smith |
| 4,268,134 A | 5/1981 | Gulati et al. |
| 4,364,878 A | 12/1982 | Laliberte et al. |
| 4,367,170 A | 1/1983 | Uhlmann et al. |
| 4,409,169 A | 10/1983 | Bartholdsten et al. |
| 4,440,672 A | 4/1984 | Chu |
| 4,442,061 A | 4/1984 | Matsuda et al. |
| 4,490,495 A | 12/1984 | Weber |
| 4,495,015 A | 1/1985 | Petcen |
| 4,519,763 A | 5/1985 | Matsuda et al. |
| 4,540,534 A | 9/1985 | Grendol |
| 4,590,144 A | 5/1986 | Schornick et al. |
| 4,628,134 A | 12/1986 | Gould et al. |
| 4,645,317 A | 2/1987 | Frieder et al. |
| 4,650,533 A | 3/1987 | Parker et al. |
| 4,679,918 A | 7/1987 | Ace |
| 4,699,473 A | 10/1987 | Chu |
| 4,756,973 A | 7/1988 | Sakagami et al. |
| 4,767,647 A | 8/1988 | Bree |
| 4,781,452 A | 11/1988 | Ace |
| 4,793,703 A | 12/1988 | Fretz, Jr. |
| 4,828,769 A | 5/1989 | Maus et al. |
| 4,839,110 A | 6/1989 | Kingsbury |
| 4,867,553 A | 9/1989 | Frieder |
| 4,873,029 A | 10/1989 | Blum |
| 4,882,438 A | 11/1989 | Tanaka et al. |
| 4,883,548 A | 11/1989 | Onoki |
| 4,889,412 A | 12/1989 | Clere et al. |
| 4,889,413 A | 12/1989 | Ormsby et al. |
| 4,892,403 A | 1/1990 | Merle |
| 4,892,700 A | 1/1990 | Guerra et al. |
| 4,898,706 A | 2/1990 | Yabe et al. |
| 4,900,242 A | 2/1990 | Maus et al. |
| 4,917,851 A | 4/1990 | Yamada et al. |
| 4,927,480 A | 5/1990 | Vaughan |
| 4,933,119 A | 6/1990 | Weymouth, Jr. |
| 4,944,584 A | 7/1990 | Maeda et al. |
| 4,955,706 A | 9/1990 | Schmidthaler et al. |
| 4,960,678 A | 10/1990 | Tanaka et al. |
| 4,961,894 A | 10/1990 | Yabe et al. |
| 4,962,013 A | 10/1990 | Tateoka et al. |
| 4,968,545 A | 11/1990 | Fellman et al. |
| 4,969,729 A | 11/1990 | Merle |
| 4,985,194 A | 1/1991 | Watanabe |
| 4,992,347 A | 2/1991 | Hawkins et al. |
| 4,994,208 A | 2/1991 | McBain et al. |
| 5,015,523 A | 5/1991 | Kawashima et al. |
| 5,017,698 A | 5/1991 | Machida et al. |
| 5,049,321 A | 9/1991 | Galic |
| 5,049,427 A | 9/1991 | Starzewski et al. |
| 5,051,309 A | 9/1991 | Kawaki et al. |
| 5,073,423 A | 12/1991 | Johnson et al. |
| 5,106,998 A | 4/1992 | Tanaka et al. |
| 5,120,121 A | 6/1992 | Rawlings et al. |
| 5,130,058 A | 7/1992 | Tanaka et al. |
| 5,147,585 A | 9/1992 | Blum |
| 5,149,181 A | 9/1992 | Bedford |
| 5,175,201 A | 12/1992 | Forgione et al. |
| 5,188,787 A | 2/1993 | King et al. |
| 5,214,453 A | 5/1993 | Giovanzana |
| 5,223,862 A | 6/1993 | Dasher et al. |
| 5,246,989 A | 9/1993 | Iwamoto et al. |
| 5,252,450 A | 10/1993 | Schwerzel et al. |
| 5,266,447 A | 11/1993 | Takahashi et al. |
| 5,268,231 A | 12/1993 | Knapp-Hayes |
| 5,286,419 A | 2/1994 | Van Ligten et al. |
| 5,288,221 A | 2/1994 | Stoerr et al. |
| 5,292,243 A | 3/1994 | Gibbemeyer |
| 5,327,180 A | 7/1994 | Hester, III et al. |
| 5,336,261 A | 8/1994 | Barrett et al. |
| 5,349,065 A | 9/1994 | Tanaka et al. |
| 5,391,327 A | 2/1995 | Ligas et al. |
| 5,405,557 A | 4/1995 | Kingsbury |
| 5,430,146 A | 7/1995 | Tanaka et al. |
| 5,433,810 A | 7/1995 | Abrams |
| 5,434,707 A | 7/1995 | Dalzell et al. |
| 5,435,963 A | 7/1995 | Backovan et al. |
| 5,449,558 A | 9/1995 | Hasegawa et al. |
| 5,523,030 A | 6/1996 | Kingsbury |
| 5,531,940 A | 7/1996 | Gupta et al. |
| 5,631,720 A | 5/1997 | Guglielmetti et al. |
| 5,658,502 A | 8/1997 | Hughes |
| 5,699,182 A | 12/1997 | Alfekri |
| 5,702,645 A | 12/1997 | Hughes |
| 5,702,813 A | 12/1997 | Murata et al. |
| 5,708,063 A | 1/1998 | Imura et al. |
| 5,728,758 A | 3/1998 | Smith |
| 5,751,481 A | 5/1998 | Dalzell et al. |
| 5,757,459 A | 5/1998 | Bhalakia et al. |
| 5,770,115 A | 6/1998 | Misura |
| 5,800,744 A | 9/1998 | Munakata |
| 5,827,614 A | 10/1998 | Bhalakia et al. |
| 5,840,926 A | 11/1998 | Hughes |
| 5,851,328 A | 12/1998 | Kohan |
| 5,851,585 A | 12/1998 | Gupta et al. |
| 5,854,710 A | 12/1998 | Rao et al. |
| 5,856,860 A | 1/1999 | Bhalakia et al. |
| 5,872,648 A | 2/1999 | Sanchez et al. |
| 5,951,939 A | 9/1999 | Chernyak et al. |
| 6,025,026 A | 2/2000 | Smith et al. |
| 6,068,797 A | 5/2000 | Hunt |
| 6,074,579 A * | 6/2000 | Greshes ......................... 264/1.7 |
| 6,083,597 A | 7/2000 | Kondo |
| 6,096,246 A | 8/2000 | Chan et al. |
| 6,107,395 A | 8/2000 | Rosthauser et al. |
| 6,113,812 A | 9/2000 | Hughes |
| 6,113,813 A | 9/2000 | Goudjil |
| 6,114,437 A | 9/2000 | Brown et al. |
| 6,138,286 A | 10/2000 | Robrahn et al. |
| 6,145,984 A | 11/2000 | Farwig |
| 6,146,578 A | 11/2000 | Van Ert et al. |
| 6,150,430 A | 11/2000 | Walters et al. |
| 6,165,392 A | 12/2000 | Kobuchi et al. |
| 6,166,129 A | 12/2000 | Rosthauser et al. |
| 6,177,032 B1 | 1/2001 | Smith et al. |
| 6,180,033 B1 * | 1/2001 | Greshes ...................... 264/1.32 |
| 6,187,444 B1 | 2/2001 | Bowles, III et al. |
| 6,254,712 B1 | 7/2001 | Enlow et al. |
| 6,256,152 B1 | 7/2001 | Coldrey et al. |
| 6,296,785 B1 | 10/2001 | Nelson et al. |
| 6,309,313 B1 | 10/2001 | Peter |
| 6,319,433 B1 | 11/2001 | Kohan |
| 6,328,446 B1 | 12/2001 | Bhalakia et al. |
| 6,333,073 B1 | 12/2001 | Nelson et al. |
| 6,334,681 B1 | 1/2002 | Perrott et al. |
| 6,353,078 B1 | 3/2002 | Murata et al. |
| 6,390,621 B1 | 5/2002 | Maki et al. |
| 6,416,690 B1 * | 7/2002 | Soane et al. ................... 264/1.7 |
| 6,441,077 B1 | 8/2002 | Border et al. |
| 6,521,146 B1 | 2/2003 | Mead |
| 6,547,390 B1 | 4/2003 | Bernheim et al. |
| 6,585,373 B2 | 7/2003 | Evans et al. |

| | | | |
|---|---|---|---|
| 6,608,215 B2 | 8/2003 | Qin | |
| 6,613,433 B2 | 9/2003 | Yamamoto et al. | |
| 6,698,884 B2 | 3/2004 | Perrott et al. | |
| 6,770,324 B2 | 8/2004 | Hooker | |
| 6,797,383 B2 | 9/2004 | Nishizawa et al. | |
| 6,807,006 B2 | 10/2004 | Nakagoshi | |
| 6,814,896 B2 | 11/2004 | Bhalakia et al. | |
| 6,863,844 B2 | 3/2005 | Engardio et al. | |
| 6,863,848 B2 | 3/2005 | Engardio et al. | |
| 6,971,116 B2 | 11/2005 | Takeda et al. | |
| 7,004,583 B2 * | 2/2006 | Miniutti et al. | 351/159 |
| 7,008,568 B2 | 3/2006 | Qin | |
| 7,021,761 B2 | 4/2006 | Künzler et al. | |
| 7,025,457 B2 | 4/2006 | Trinh et al. | |
| 7,025,458 B2 | 4/2006 | Vu | |
| 7,036,932 B2 | 5/2006 | Boulineau et al. | |
| 7,048,997 B2 | 5/2006 | Bhalakia et al. | |
| 7,077,985 B2 * | 7/2006 | Maki et al. | 264/1.7 |
| 7,104,648 B2 | 9/2006 | Dahi et al. | |
| 7,258,437 B2 * | 8/2007 | King et al. | 351/164 |
| 7,335,702 B2 | 2/2008 | La Dous | |
| 7,350,917 B2 | 4/2008 | Kawai et al. | |
| 7,465,414 B2 | 12/2008 | Knox et al. | |
| 7,500,749 B2 | 3/2009 | Vu | |
| 2001/0035935 A1 | 11/2001 | Bhalakia et al. | |
| 2002/0197484 A1 | 12/2002 | Nishizawa et al. | |
| 2003/0184863 A1 | 10/2003 | Nakagoshi | |
| 2004/0125335 A1 | 7/2004 | Vu | |
| 2004/0207809 A1 | 10/2004 | Blackburn et al. | |
| 2005/0009964 A1 | 1/2005 | Sugimura et al. | |
| 2005/0168689 A1 | 8/2005 | Knox | |
| 2005/0168690 A1 | 8/2005 | Kawai et al. | |
| 2005/0233153 A1 | 10/2005 | Qin et al. | |
| 2006/0065989 A1 | 3/2006 | Druffel et al. | |
| 2006/0146278 A1 | 7/2006 | Vu | |
| 2006/0187411 A1 | 8/2006 | Boulineau et al. | |
| 2006/0192306 A1 | 8/2006 | Giller et al. | |
| 2006/0244909 A1 | 11/2006 | Maki et al. | |
| 2006/0264563 A1 | 11/2006 | Hanrahan et al. | |
| 2007/0001327 A1 | 1/2007 | Chiu | |
| 2007/0122626 A1 | 5/2007 | Qin et al. | |
| 2007/0177100 A1 | 8/2007 | Knox | |
| 2007/0291345 A1 | 12/2007 | Kumar et al. | |

FOREIGN PATENT DOCUMENTS

| | | |
|---|---|---|
| AU | 2003225785 B2 | 9/2003 |
| AU | 2004270746 B2 | 3/2005 |
| EP | 0 050 594 A2 | 4/1982 |
| EP | 0 134 633 A2 | 3/1985 |
| EP | 0 299 509 A2 | 1/1989 |
| EP | 0 415 716 A1 | 6/1991 |
| EP | 0 552 498 A1 | 7/1993 |
| EP | 0 814 956 B2 | 1/1998 |
| EP | 1 162 482 A2 | 12/2001 |
| EP | 1 273 925 A1 | 1/2003 |
| GB | 2 174 711 A | 11/1986 |
| JP | 56-13139 | 2/1981 |
| JP | 56013139 | 2/1981 |
| JP | 56-013139 | 9/1981 |
| JP | 58173181 A | 10/1983 |
| JP | 36-0195515 A | 10/1985 |
| JP | 61-005910 | 1/1986 |
| JP | 61-032004 | 2/1986 |
| JP | 36-1236521 A | 10/1986 |
| JP | 61-276882 | 12/1986 |
| JP | 63-061203 | 3/1988 |
| JP | 63-178193 | 7/1988 |
| JP | 10-22538 | 1/1989 |
| JP | 03-132701 | 6/1991 |
| JP | 03-269507 | 12/1991 |
| JP | 03 282445 | 12/1991 |
| JP | 04-358145 | 12/1992 |
| JP | 05 032965 | 2/1993 |
| JP | 62-38689 | 8/1994 |
| JP | 07 048363 | 2/1995 |
| JP | 09-001716 A | 1/1997 |
| JP | 2002196103 A | 7/2002 |
| JP | 2004 034609 | 2/2004 |
| WO | WO 81/00769 A1 | 3/1981 |
| WO | WO 95/15845 A1 | 6/1995 |
| WO | WO 96/34735 A1 | 11/1996 |
| WO | WO 98/37115 A1 | 8/1998 |
| WO | WO 01/49478 A2 | 7/2001 |
| WO | WO 02/093235 A1 | 11/2002 |
| WO | WO 03/078148 A1 | 9/2003 |
| WO | WO 2004/011235 A1 | 2/2004 |
| WO | WO 2004/068217 A2 | 8/2004 |
| WO | WO 2005/023529 A2 | 3/2005 |
| WO | WO 2006/094312 A2 | 9/2006 |
| WO | WO 2007/041347 A2 | 4/2007 |

OTHER PUBLICATIONS

IP Australia, Notice of Acceptance mailed Nov. 17, 2010 in Australian Patent Application No. 2004270746, 3 pages.
United States Patent and Trademark Office, Office Action mailed Oct. 6, 2010 in U.S. Appl. No. 11/368,929, 12 pages.
United States Patent and Trademark Office, Office Action mailed Sep. 17, 2010 in U.S. Appl. No. 11/458,255, 9 pages.
United States Patent and Trademark Office, Office Action mailed Sep. 7, 2010 in U.S. Appl. No. 12/401,277, 12 pages.
United States Patent and Trademark Office, Notice of Allowance mailed Aug. 31, 2010 in U.S. Appl. No. 11/537,571, 4 pages.
United States Patent and Trademark Office, Office Action mailed May 28, 2010 in U.S. Appl. No. 11/537,571, 6 pages.
United States Patent and Trademark Office, Office Action mailed May 26, 2010 in U.S. Appl. No. 11/398,819, 6 pages.
European Patent Office, Examination Report mailed Apr. 26, 2010 in European Patent Application No. 03 744 674.7-2307, 5 pages.
United States Patent and Trademark Office, Office Action mailed Mar. 29, 2010 in U.S. Appl. No. 12/401,277, 12 pages.
United States Patent and Trademark Office, Final Office Action mailed Mar. 8, 2010 in U.S. Appl. No. 11/458,255, 7 pages.
United States Patent and Trademark Office, Final Office Action mailed Feb. 23, 2010 in U.S. Appl. No. 10/938,275, 11 pages.
United States Patent and Trademark Office, Final Office Action mailed Oct. 29, 2009 in U.S. Appl. No. 11/368,929, 9 pages.
IP Australia, Examiner's Report mailed Oct. 29, 2009 in Australian Patent Application No. 2004270746, 3 pages.
United States Patent and Trademark Office, Office Action mailed Aug. 24, 2009 in U.S. Appl. No. 11/537,571, 12 pages.
United States Patent and Trademark Office, Office Action mailed Aug. 6, 2009 in U.S. Appl. No. 11/398,819, 5 pages.
United States Patent and Trademark Office, Office Action mailed Jul. 16, 2009 in U.S. Appl. No. 10/938,275, 10 pages.
United States Patent and Trademark Office, Office Action mailed Jun. 22, 2009 in U.S. Appl. No. 11/458,255, 5 pages.
United States Patent and Trademark Office, Office Action mailed Mar. 9, 2009 in U.S. Appl. No. 11/368,929, 16 pages.
European Patent Office, Examination Report mailed Mar. 3, 2009 in European Patent Application No. 03744674.7-2307, 3 pages.
United States Patent and Trademark Office, Final Office Action mailed Jan. 23, 2009 in U.S. Appl. No. 11/458,255, 5 pages.
United States Patent and Trademark Office, Final Office Action mailed Dec. 5, 2008 in U.S. Appl. No. 10/938,275, 10 pages.
United States Patent and Trademark Office, Final Office Action mailed Dec. 1, 2008 in U.S. Appl. No. 11/398,819, 6 pages.
United States Patent and Trademark Office, Notice of Allowance mailed Oct. 28, 2008 in U.S. Appl. No. 11/370,731, 7 pages.
United States Patent and Trademark Office, Office Action mailed Jun. 24, 2008 in U.S. Appl. No. 11/458,255, 8 pages.
United States Patent and Trademark Office, Office Action mailed Jun. 20, 2008 in U.S. Appl. No. 10/938,275, 10 pages.
European Patent Office, Examination Report mailed May 14, 2008 in European Patent Application No. 06816842.7-1234, 2 pages.
United States Patent and Trademark Office, Office Action mailed May 1, 2008 in U.S. Appl. No. 11/370,731, 11 pages.
United States Patent and Trademark Office, Office Action mailed Apr. 8, 2008 in U.S. Appl. No. 11/398,819, 6 pages.
United States Patent and Trademark Office, Notice of Allowance mailed Jan. 25, 2008 in U.S. Appl. No. 11/398,814, 7 pages.
United States Patent and Trademark Office, Office Action mailed Oct. 18, 2007 in U.S. Appl. No. 11/370,731, 11 pages.

United States Patent and Trademark Office, Final Office Action mailed Oct. 9, 2007 in U.S. Appl. No. 10/938,275, 9 pages.
IP Australia, Examiner's Report mailed Sep. 12, 2007 in Australian Patent Application No. 2003225785, 2 pages.
WIPO, U.S. International Searching Authority, International Search Report and Written Opinion mailed Aug. 27, 2007 in International Patent Application No. PCT/US06/08444, 7 pages.
United States Patent and Trademark Office, Office Action mailed Jul. 10, 2007 in U.S. Appl. No. 11/398,814, 10 pages.
WIPO, U.S. International Searching Authority, International Search Report and Written Opinion mailed Mar. 6, 2007 in International Patent Application No. PCT/US06/38142, 4 pages.
United States Patent and Trademark Office, Office Action mailed Jan. 8, 2007 in U.S. Appl. No. 10/938,275, 10 pages.
United States Patent and Trademark Office, Office Action mailed Dec. 28, 2006 in U.S. Appl. No. 90/007,325, 12 pages.
United States Patent and Trademark Office, Final Office Action mailed Dec. 19, 2006 in U.S. Appl. No. 11/398,814, 9 pages.
United States Patent and Trademark Office, Office Action mailed Aug. 25, 2006 in U.S. Appl. No. 90/007,325, 19 pages.
United States Patent and Trademark Office, Office Action mailed Jul. 5, 2006 in U.S. Appl. No. 11/398,814, 8 pages.
United States Patent and Trademark Office, Notice of Allowance mailed Mar. 15, 2006 in U.S. Appl. No. 10/389,353, 8 pages.
United States Patent and Trademark Office, Notice of Allowance mailed Nov. 16, 2005 in U.S. Appl. No. 09/848,594, 6 pages.
WIPO, U.S. International Preliminary Examining Authority, International Preliminary Report on Patentability mailed Sep. 20, 2005 in International Patent Application No. PCT/US04/30023, 4 pages.
United States Patent and Trademark Office, Office Action mailed Jul. 27, 2005 in U.S. Appl. No. 10/389,353, 8 pages.
United States Patent and Trademark Office, Final Office Action mailed Jun. 21, 2005 in U.S. Appl. No. 09/848,594, 7 pages.
WIPO, U.S. International Searching Authority, International Search Report and Written Opinion mailed Apr. 4, 2005 in International Patent Application No. PCT/US04/30023, 8 pages.
United States Patent and Trademark Office, Office Action mailed Jan. 25, 2005 in U.S. Appl. No. 10/389,353, 10 pages.
United States Patent and Trademark Office, Office Action mailed Dec. 8, 2004 in U.S. Appl. No. 09/848,594, 8 pages.
United States Patent and Trademark Office, Office Action mailed Feb. 20, 2004 in U.S. Appl. No. 09/848,594, 9 pages.
United States Patent and Trademark Office, Office Action mailed Jul. 27, 2004 in U.S. Appl. No. 10/183,088, 3 pages.
United States Patent and Trademark Office, Notice of Allowance mailed Dec. 17, 2003 in U.S. Appl. No. 10/183,088, 5 pages.
United States Patent and Trademark Office, Office Action mailed Jun. 2, 2003 in U.S. Appl. No. 09/848,594, 12 pages.
United States Patent and Trademark Office, Office Action mailed Apr. 9, 2003 in U.S. Appl. No. 10/183,088, 8 pages.
United States Patent and Trademark Office, Final Office Action mailed Mar. 5, 2003 in U.S. Appl. No. 09/854,419, 11 pages.
United States Patent and Trademark Office, Office Action mailed Sep. 4, 2002 in U.S. Appl. No. 09/854,419, 12 pages.
United States Patent and Trademark Office, Notice of Allowance mailed Jan. 8, 2001 in U.S. Appl. No. 09/425,517, 7 pages.
United States Patent and Trademark Office, Office Action mailed Sep. 22, 2000 in U.S. Appl. No. 09/425,517, 11 pages.
ORCOLITE, Press release: "ORCOLITE® Releases the Industry's first Prescription Polarized Polycarbonate lens—PolarPoly™," Oct. 2, 1995, Azusa, California, 2 pages.
Mitsubishi Engineering Plastics Corp., Material Safety Data sheet, Jun. 1, 1995, 4 pages.
MGC, "Coated Film Insert Injection Process," Oct. 1988, pp. 122-128, Rev. 1993.8, Lot No. 93 08 2000 DPR.
Frames Product Guide, "Lenses," Jan. 1993, 2 pages.
KB Co. Publication.
Japanese Publication.

* cited by examiner

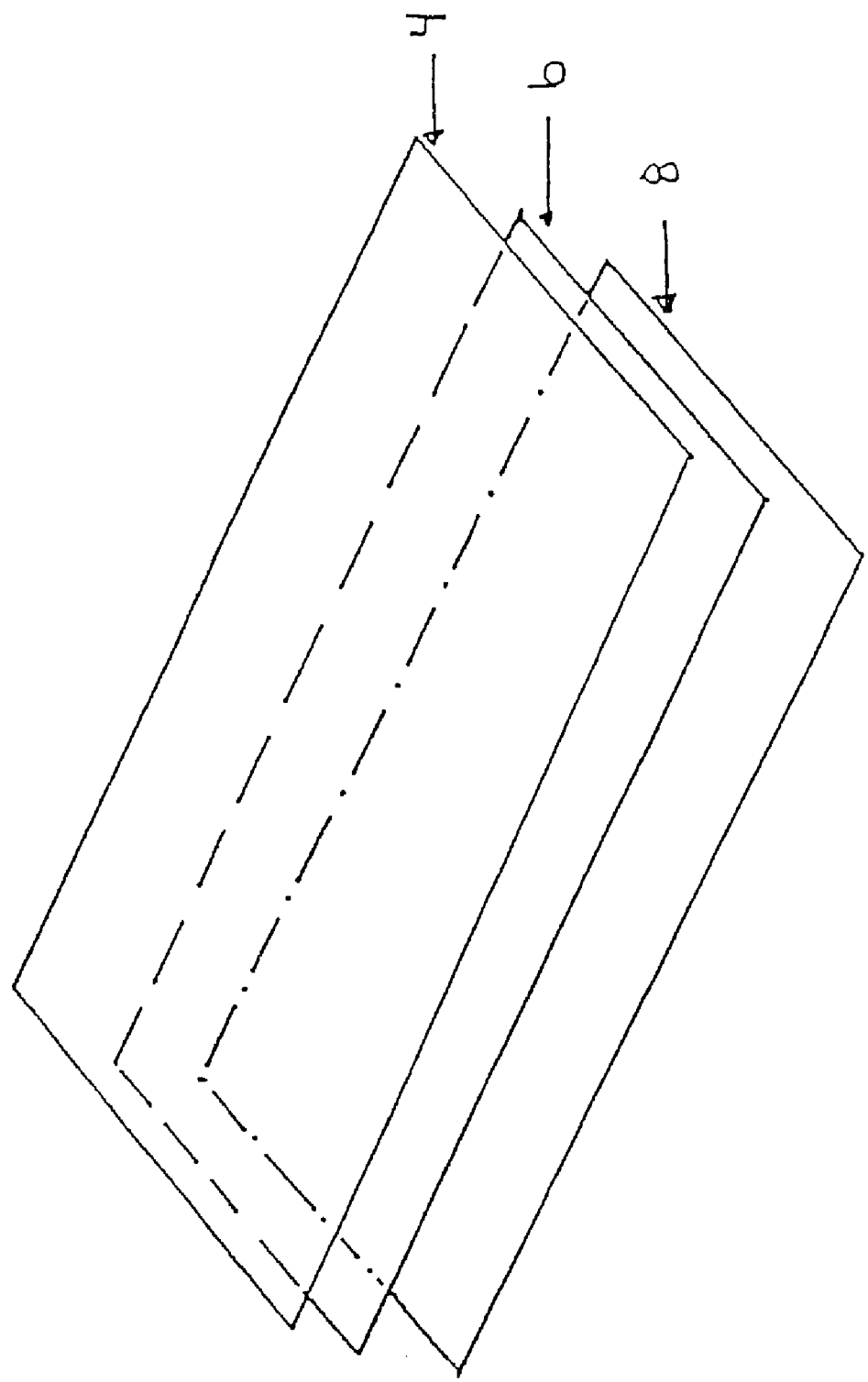

INJECTION MOLDING OF LENS

CROSS REFERENCE TO RELATED APPLICATIONS

The present invention is a continuation of U.S. patent application Ser. No. 10/389,353 filed Mar. 13, 2003, now U.S. Pat. No. 7,077,985 which claims benefit of U.S. Provisional Application Ser. No. 60/364,839, filed Mar. 13, 2002 and is a continuation-in-part of U.S. patent application Ser. No. 09/854,419 filed May 11, 2001 (abandoned) and U.S. patent application Ser. No. 09/580,162 filed May 30, 2000 (now U.S. Pat. No. 6,390,621 issued May 21, 2002), all of which are incorporated herein by reference.

BACKGROUND OF THE INVENTION

This invention relates to formulation of laminate functional layers both in their use alone or in the injection molding of ophthalmic lenses. It also relates to injection molding of ophthalmic lenses. In this regard, the following patent documents are hereby incorporated by reference into this application in their entirety: U.S. Pat. No. 6,328,446 entitled Production of Optical Elements and Co-Pending U.S. application Ser. No. 09/580,162 filed May 23, 2000 entitled Manufacture of Positive Power Ophthalmic Lenses, both of which are commonly assigned to the assignee of the present application.

BACKGROUND OF THE ART

Curved photochromic lenses and flat or slightly curved laminates are known to be useful in spectacles, masks, goggles and optical instruments. These types of lenses and their carriers increasingly use a layer(s) of light-sensitive photochromic material on a substrate layer or between a pair of substrate sheets or plates or on an optical surface. These types of constructions have been used for many years.

Typically, curved photochromic optical lenses (including plano lenses) of the types described include a photochromic layer between inner and outer layers or on a surface of layers of light-transmissive material. These light-transmissive materials serve to define the light-refracting surfaces of the finished lens. In the case of lenses for use in spectacles, those layers nearest and furthest, respectively, from the eye of the wearer define the concave and convex light-refracting surfaces of the lens. The inner and outer lens elements of a composite can be produced according to known techniques such as casting and molding (including injection molding). The photochromic layer has been added by various techniques, including direct coating of layers comprising the photochromic material onto a surface of the lens. An additional protective layer would often then have to be provided over the photochromic layer. The production of curved polarizing lenses substantially free of haze and cosmetic defects is described in U.S. Pat. No. 3,560,076.

In U.S. Pat. No. 5,327,180, a polarizing lens is prepared by preparing lens elements of suitable material (e.g., by grinding), cleaning the lens elements thoroughly and laminating the elements with a light-polarizing film disposed therebetween.

Alternatively, a curved photochromic layer containing lens can be made by placing a photochromic layer in a mold having surfaces of desired curvature and filling the mold with fluid glass, as is disclosed for use with polarizing layers in U.S. Pat. No. 2,387,308. The mold surfaces can be predetermined to provide the refractive power desired in the finished lens that is removed from the mold after hardening of the fluid glass. In each of U.S. Pat. Nos. 3,711,417 and 3,786,119, the production of a curved lens having a light polarizer between surfaces of polymerized monomer is described. In each case, a mold having predetermined shaping surfaces and a polarizer disposed there between is filled with polymerizable monomer. The resulting plastic lens blank removed from the mold after polymerization of the monomer is shaped or ground to desired power.

U.S. Pat. No. 4,268,134 describes a lightweight laminated photochromic lens comprising a buried layer of photochromic glass, surface layers of optically clear plastic, and adhesive bonding layers of high strength but low elastic modulus between the buried glass and plastic surface layers. Polyurethane adhesives are generally disclosed, as are attempts with pressure-sensitive acrylic resins, crosslinked acrylic resins, modified acrylic esters, cellulose acetate butyrate, epoxy resins, soft epoxy resins, silicone resins, and highly plasticized polyvinyl butyral resins.

Photochromatic compounds are substances which have the characteristic of reversibly changing colour and/or degree of light transmission when exposed to certain types of electromagnetic radiation and solar light, returning to their initial state of colour and light transmission as soon as the source of light is removed.

There are many known substances which have photochromatic characteristics and which belong to different classes of both organic and inorganic compounds, as described for example in "Photochromism", G. H. Brown (Ed.), Vol. 32 of the Weissberger series "Techniques of Organic Chemistry", Wiley Interscience, N.Y. (1971).

Among the better known organic photochromatic compounds are those belonging to the group of spiro-indoline-oxazines and spiro-indoline-pyranes, which are able to give photochromatic characteristics to polymer systems for paints, inks, adhesives, as well as to polymerized organic materials used for sun filters, optical instruments, optical memories, printing, photography, fabrics, decorating articles, toys, as described for example in U.S. Pat. Nos. 3,562,172, 3,578,602, 4,215,010, 4,342,668 and in European patent applications 134.633 and 141.407.

According to the known art, a photochromatic compound can be deposited on an article by means of impregnation or thermal transfer, as specified in U.S. Pat. No. 4,286,957. There is also the possibility of applying the photochromatic compound immersed in a paint spread over the surface of the article which is to become photochromatic. These methods of surface application, at times, allow articles to conserve their photochromatic characteristics only for limited periods of time. The introduction of a photochromatic compound into the mass of an article, especially when this is made of thermoplastic material, can, on the other hand, create problems to which no satisfactory solution has yet been found. Thermoplastic materials are transformed into finished articles by the usual techniques of molding, extrusion and the like. In the conditions, especially of temperature, under which these processes are carried out, the organic photochromatic compounds are likely to undergo degradation or at least degeneration, accompanied by the irreversible development of undesirable coloring. In addition, it is also known that organic photochromatic compounds incorporated in polymer matrices or in solutions, undergo rapid degradation, losing their photochromatic activity due to exposure to light under normal conditions of use.

Among proposed solutions to these problems has been mixing, either before or during the processing phase of the thermoplastic organic polymers, an organic photochromatic compound with, respectively, a basic organic compound containing nitrogen, chosen from non-cyclic or cyclic, non-aromatic amines, amidines and guanidines, or sterically hindered amines containing silicon in their molecular structure. Photochromatic compositions are also known (U.S. Pat. No. 4,720,356), which are fatigue resistant under light and which include a spirooxazine combined with a sterically hindered amine, chosen from those normally used for the stabilization of organic polymers to ultraviolet light.

U.S. Pat. No. 5,242,624 asserts that it is possible to prolong the photochromatic activity of photochromatic substances of interest, beyond any presumably known limit of the stabilizing effect of the above-mentioned compounds, by adding to one or more of the photochromatic substances, a stabilizing mixture comprising an amine chosen from 1,4-diazabicyclo-(2.2.2) octane (DABCO) and quinuclidine or their derivatives, and at least one sterically hindered amine. This mixture stabilizes the photochromatic characteristics of the substance to which it has been added for a much longer period than the presumable contribution of any single additive, in such a way that the loss of photochromatic activity occurs after a period which is at least several times greater compared to that of a product which does not contain one of the above cyclic amines.

It is essential to plastic photochromic lens blanks (and finished lenses) to have good photochromic response, good color availability, efficiency, durability and abrasion resistance and which can be manufactured by resort to simple and efficient manufacturing techniques. Moreover, it will be beneficial, particularly in the case of lens blanks for the production of prescription (e.g., vision-correcting) ophthalmic lenses, that the curvatures of the lens blank surfaces correspond at least approximately to those needed to provide the predetermined prescriptive properties of a finished lens. It will be appreciated that production of a composite lens blank by a process which requires that separate inner and outer lens elements be first ground and polished and, then, bonded (laminated) together with a preformed (curved) photochromic layer there between will be a tedious, labor-intensive and inefficient process. Similarly, production of a lens blank by resort to a method which requires the preforming of a curved photochromic layer, placement of the preformed photochromic element into a mold, filling of the mold with polymerizable monomer, curing (polymerization) of the monomer and release of the curved blank or lens from the mold will be labor intensive, time-consuming and inefficient. Additionally, it is important for the photochromic layer to be used in as a mild a manufacturing environment as possible to reduce stress on the photochromic compounds.

The ease with which a photochromic lens can be prepared from a lens blank, and particularly the optical properties of the lens, will be influenced by the nature of the materials (and the process steps) used in the production of the lens. For example, glass is an optically isotropic material that by reason of its non-rotatory affect on polarized light is especially adapted to utilization in optical devices that include light affecting agents. Glass is not, however, adapted readily to convenient forming (e.g., thermoforming or bending) methods. Moreover, depending upon the particular materials used, the forming method may induce strain and orientation in the photochromic layer or the lighttransmissive layers of the lens blank, manifested by optical distortion and reduced consistency or efficiency of the photochromic layer. Sufficient distortion of the photochromic layer can cause streaking visible both to the wearer and to an observer of the lenses. Depending upon the nature of polymerizable monomer used in a method based upon in situ polymerization in a mold, shrinkage of the cured resin and the development of physical strains can result in reduced consistency or efficiency. Apart from considerations that relate particularly to prescription lenses, it will often times be important that lenses intended for sunglass applications have good durability and abrasion resistance so as to withstand the conditions of use and abuse encountered frequently in the case of sunglasses.

SUMMARY OF THE INVENTION

It has been found that a stable, polymeric photochromic laminate may be used as the base plate or shield of goggles or other such eyewear. The photochromic laminate may be secured across open areas where variable light filtering is desired, without the laminate being further adhered to other surfaces. It has also been found that a stable, polymeric photochromic laminate may be applied to surfaces, particularly polycarbonate or polysulfone surfaces to provide a stable photochromic effect to that surface. The polymeric photochromic laminate may be applied to flat, textured or curved surfaces, including lens blanks, semi-finished lenses, finished lenses and composite lens blank, suited to the production therefrom of a light-changing surface or lens having good photochromic efficiency and durability, can be prepared in a simple and efficient manner from low-cost photochromic light-transmissive lens-forming materials configured in proper relation in a photochromic laminable composite. The use of a polyester urethane substantive composition in combination with a photochromic dye or pigment as the substantive layer between polymeric support layers that can be laminated to surfaces by using the polymeric support layers as the adhesive or adhesive bearing surface to form the final article. Surprisingly, the use of polyester urethanes has been found to be substantially better than the use of polyether urethane adhesives, even though no specific reason for this increased performance is known.

In accordance with the invention, there is provided a unitary photochromic laminate (hereinafter referred to herein as a "sub-element") for application to surfaces comprising:
 a first light-transmissive polymeric layer comprising a polycarbonate or polysulfone resin;
 at least a second light-transmissive polymeric photochromic layer comprising a polyester urethane and a photochromic compound; and
 an optional third light-transmissive polymeric layer comprising a polycarbonate or polysulfone resin.

The sub-element can be used as is for goggle-type applications. The sub-element can also in turn be laminated to a surface such as a lens surface to form the photochromic article, such as a photochromic lens blank. The surface may be any material, preferably a polymeric material, more preferably a polycarbonate or polysulfone material, such as a lens material, including polymeric materials (particularly polycarbonate or polysulfone lenses). The laminable photochromic sub-element may have some curvature to it, or may be shaped during the lamination process to conform to the curvature of the lens surface. The use of a preformed curvature in the sub-element assists in reducing the strain and distortion that can occur during formation of the lens blank, but is not essential where conditions and degree of curvature are carefully controlled.

The sub-element may be used in three positions on a composite lens. Where there is a single lens element, the sub-element may be adhered to the convex or the concave (exterior and interior, respectively) surfaces. Where the lens element is formed by the lamination of two distinct portions together, the sub-element may be positioned on the concave surface of either lens element, or on the convex surface of either lens element, allowing the sub-element to be placed on the exterior surface, on an interior surface, or between the two lens elements (in contact with both a concave and a convex surface).

The relative sizes of the layers may be respectively varied. It is convenient for the first light-transmissive layer to correspond to or define a convex surface of said lens blank (the first layer may be a thin layer relative to the second light-transmissive layer, or of equal or larger dimensions), Similarly, the back-side of the second light-transmissive layer defines a concave surface of the lens blank and may be substantially thicker than (or the same size or thinner than) the first light-transmissive layer. The thickness of the final composite (e.g. the laminable sub-element and the lens substrate, particularly where the sub-element is sandwiched between two lens elements) should be sufficient to permit grinding of the surfaces and edges thereof for production of optical properties desired in said photochromic optical lens. The polyester urethane layer and the polycarbonate or polysulfone layer general have dimensions between about 3 and 25 micrometers, more usually between 5 and 20 micrometers, still more usually between 5 and 15 micrometers. It can be seen from these dimensions that the layers are, by themselves, not sufficient to provide sturdy structural elements such as ophthalmic lenses, so in that instance they must be laminated to the sturdier elements.

The convex surface of said unitary laminar curved composite lens blank provides at least substantially the optical properties desired in the photochromic optical lens and the, concave surface being grindable to a surface, thus providing the photochromic optical lens with said desired optical properties. The photochromic layer and at least one of the other light-transmissive layers are aligned such that a principal index of refraction direction of the light-transmissive layer is in substantial parallelism with the ophthalmic axis of the photochromic layer.

In one aspect of a method that forms part of the present invention, a method prepares a lens blank or a ground lens therefrom by steps comprising:

providing a supply of a laminable sub-element structure, the laminable sub-element structure comprising (the laminable material being as described above, but shown immediately below as a preferred, but non-limiting description), in order and in superposed relation, a first light-transmissive polymeric layer, a photochromic layer, and a second light-transmissive polymeric layer, the first light-transmissive layer being a thin layer relative to said second light-transmissive layer, said second light-transmissive layer being substantially thicker than said first light-transmissive layer and having a thickness sufficient to permit the shaping (e.g., grinding) of material therefrom (e.g., in the optical grinding of a concave surface of a lens to be formed from the laminar composite structure). In the case of the formation of ophthalmic lenses, the photochromic layer and at least the first of the first and second light-transmissive layers being aligned such that focal axes are aligned;

cutting and removing material from the supply at said laminar composite structure a unitary portion of a size sufficient for the production therefrom of a photochromically enhanced surface, such as a curved lens;

placing the unitary portion between opposed polymeric surfaces (e.g., concave and convex platens). Where the final article is to be curved, the first light-transmissive layer of said portion should be positioned for shaping by a concave platen;

heating and pressing the platens together, and in the case of the curved surfaces, the pressing being sufficient to shape said unitary portion into a curved tens having a convex surface defined by the first light-transmissive layer thereof and a concave surface defined by the second light-transmissive layer thereof, each surface having a radius of curvature corresponding substantially to the radius of curvature of the respective platen forming that particular surface; and removing the article (e.g., the shaped curved lens) from between the platens.

BRIEF DESCRIPTION OF THE DRAWINGS

FIG. 1 is an isometric view showing in exploded relation the respective layers of a plastic composite photochromic laminate comprising a polyester urethane photochromic layer between thermoformable light-transmissive sheets, from which composite laminate a photochromic ophthalmic lens blank of the invention can be formed.

DETAILED DESCRIPTION OF THE INVENTION

As mentioned previously, the present invention is directed to a flat or curved laminate structure and a plastic photochromic lens blank which can be produced in a simple and efficient manner from relatively low-cost polymeric sheet materials and which can be used to provide goggles, face shields, windows, window coverings, skylights, etc., and optical lenses having efficient, uniform and high quality photochromic properties. The manner in which these realizations are accomplished is not significantly dependent upon the utilization of particular materials in proper relation to one another, i.e., there is no prescribed order and arrangement, as will become apparent from the detailed description provided hereinafter. There may be a desire to have a protective exterior layer (e.g.) an abrasion resistant layer) in combination with the lens system, but that may be provided in various methods. In the case of using the laminate in a goggle application, the laminate may be hard coated on one or both outer surfaces with an abrasion resistant coating, antireflective coating, and/or an anti-fog hard coating.

As used herein, a lens "blank" refers to a curved (convex and/or concave, plano or prescription) unitary laminate comprising a photochromic layer between light transmissive polymeric layers of the character already described and of a size and shape from which an optical lens having desired optical properties can be made by edge grinding, cutting and, if needed, optical grinding and polishing of the concave surface of the lens blank. Optical grinding of the concave surface can be used to adapt the lens blank to the optical properties desired in a "finished" lens which can be used in optical equipment, or in the case of ophthalmic lenses, for the production of zero-power or vision-correcting lenses. In general, it will be convenient, in order to accommodate a range of ophthalmic lens prescriptions, to prepare a "family" or series of ophthalmic lens blanks, the members of which have a convex surface formed to a spherical curvature of, for example, any diopter within the range generally used in prescriptions. Where grinding is tolerable in the process, more generic diopters such as two, four, six or nine Diopters may be used. Where more precise lens curvatures are to be provided (as with diopters provided in increments of 0.1, 0.2, 0.25 or the like), the grinding would not be necessary. The radii of curvature of the lens-forming surfaces of the platens needed to form the respective lens blanks can be determined by resort to known principles of physics and optics. The curved lens blanks can be piano, spherical, aspherical, toroidal, lenticular, monofocal or multifocal and can be of zero power or vision correcting. By selecting a particular lens blank from the series (or "family") of blanks, a particular prescription can be filled by lamination alone, or with optical grinding (surfacing) of the concave surface of the blank to the particular radius of curvature, calculated on the basis of known ophthalmic formulae for the ophthalmic power of the lens. Knowing the prescribed lens power, convex radius of the blank and the refractive index of the lens material, and designating the center thickness of the finished lens, the radius of curvature of the concave surface can be calculated according to conventional manner. Using conventional finishing operations, e.g., polishing and edge grinding, a "finished" optical lens, suited for insertion into an optical apparatus or into an eyeglass frame, can be prepared.

Referring now to FIG. 1, there are shown in exploded fashion the layers a layered composite structure 2 from which sections (e.g., unitary portions) can be removed (e.g., cut, sliced, converted, punched, etc.) for shaping into a photochromic optical lens blank. Layered composite 2 includes a surface protective layer (which may be thermoplastic or thermoset resin) 4, photochromic layer 6 laminated between the first light-transmissive polymeric surface layer (4) and the second (8) light-transmissive polymeric layer or sheets. Photochromic layer or sheet 6 comprises a polymeric layer having dissolved, dispersed or suspended therein a photochromic material which provides the photochromic functionality of the lens blank of the invention.

The sub-element may be formed in substantially the same manner as the multi-layer polarizing film described in U.S. Pat. No. 5,051,309 or as otherwise described herein. For example, after formation of the photochromic layer by admixing the ingredients, casting the ingredients onto a strippable surface, drying the materials, and stripping a dried photochromic layer from the strippable surface, the polycarbonate (or polysulfone) layer(s) will then be affixed to the photochromic layer (with stretching, if needed). This can, by way of a non-limiting example, be done according to the teachings of U.S. Pat. No. 5,051,309 by taking polycarbonate (or polysulfone) sheet of the appropriately selected thicknesses (e.g., between 0.1 and 5 mm), laminating the sheet(s) onto one or both sides of the photochromic layer (with multiple sheets oriented so that orientation directions of the sheets agree with each other), and securing the sheets together. Lamination can be effected by the use of intermediate adhesives (e.g., polycarbonate or polyurethane adhesives would be preferred, but other commercial adhesives would be satisfactory), or the polycarbonate could be laminated to the polyurethane photochromic layer. The photochromic laminate may then be vacuum formed under heat and pressure, if needed to provide curvature to the laminate. The photochromic laminate may then be laminated to the final surface or further sandwiched between layers to form the final polarizing article. The laminate may also be used in a flat form or slightly curved for use in goggles, windows, faceplates, panels, etc.

Preferably, the photochromic material is selected from an organic photochromic material comprising at least one of spiro(indoline)naphthoxazines, spiro(indoline)benzoxazines, benzopyrans, naphthopyrans, organo-metal dithizonates, fulgides and fulgimides, each of which are described in further detail herein. Particularly desirable, photochromic molecules are described, by way of non-limiting example, in U.S. Pat. Nos. 5,955,520; 5,888,432; 5,531,935; 5,200,116; and 4,818,096 and the like.

A first group of organic photochromic materials contemplated for use in the curable powder coatings compositions of the method of the present invention are those having an activated absorption maximum within the visible range of greater than 500 nanometers, greater than 590 nanometers, e.g., between greater than 500 or greater than 590 to 700 or to 720 nanometers. These materials typically exhibit a blue, bluish-green, or bluishpurple color when exposed to ultraviolet light in an appropriate solvent or matrix. Examples of classes of such materials that are useful in the present invention include, but are not limited to, spiro(indoline)naphthoxazines and spiro(indoline)benzoxazines. These and other classes of such photochromic materials are described in the open literature. See for example, U.S. Pat. Nos. 3,562,172; 3,578,602; 4,215,010; 4,342,668; 5,405,958; 4,637,698; 4,931,219; 4,816,584; 4,880,667; 4,818,096. Also see for example: Japanese Patent Publication 62/195383; and the text, Techniques in Chemistry, Volume III, "Photochromism," Chapter 3, Glenn H. Brown, Editor, John Wiley and Sons, Inc., N.Y., 1971.

A second group of organic photochromic materials contemplated for use in the curable powder coatings compositions of the method of the present invention are those having at least one absorption maximum and preferably two absorption maxima, within the visible range of between 400 and less than 500 nanometers. These materials typically exhibit a yellow-orange color when exposed to ultraviolet light in an appropriate solvent or matrix. Such materials include certain benzopyrans and naphthopyrans, both of which are commonly and collectively referred to as chromenes. Many of such chromenes are described in the open literature, e.g., U.S. Pat. Nos. 3,567,605; 4,826,977; 5,066,818; 4,826,977; 5,066,818; 5,466,398; 5,384,077; 5,238,934; and 5,274,132.

A third group of organic photochromic materials contemplated for use in the curable powder coating compositions of the method of the present invention are those having an absorption maximum within the visible range of between 400 to 500 nanometers and another absorption maximum within the visible range of between 500 to 700 nanometers. These materials typically exhibit: color(s) ranging from yellow/brown to purple/gray when exposed to ultraviolet light in an appropriate solvent or matrix. Examples of these materials include certain benzopyran compounds, having substituents at the 2-position of the pyran ring and a substituted or unsubstituted heterocyclic ring, such as a benzothieno or benzofurano ring fused to the benzene portion of the benzopyran. Such materials are described in U.S. Pat. No. 5,429,774.

Other photochromic materials contemplated for use in the curable powder coating compositions of the method of the present invention include photochromic organo-metal dithizonates, i.e., (arylazo)-thioformic arylhydrazidates, e.g., mercury dithizonates which are described in, for example, U.S. Pat. No. 3,361,706. Fulgides and fulgimides, e.g., the 3-furyl and 3-thienyl fulgides and fulgimides which are described in U.S. Pat. No. 4,931,220 at column 20, line 5 through column 21, line 38 are also useful herein.

The disclosures relating to such photochromic materials in the afore described patents are incorporated herein, in toto, by reference as background material on the availability of general photochromic materials. The curable photochromic powder coating compositions used in the present invention may contain one photochromic material or a mixture of photochromic materials, as desired. Mixtures of photochromic materials may be used to attain certain activated colors such as a near neutral gray or brown.

Layers (or sheets) 4 and 8 comprise thermoplastic polycarbonate or polysulfone materials, i.e., polymeric materials which can be formed or shaped by the influences of temperature and pressure. They may be partially cross-linked or may be crosslinkable by subsequent thermal or actinic activation.

Sheets 4 and 8 can each comprise one or more layers. Good results can be obtained using a single sheet for each of respective layers 4 and 8. As shown in FIG. 1, one of the sheets (8 in FIG. 1) has a thickness that may be substantially greater than the other of the pair of light-transmissive sheets. In general, it will be beneficial to employ: a first light transmissive sheet of thermoplastic material of a first thickness for formation in the shaped optical lens blank 2 of the convex surface of the lens blank; and a second light-transmissive sheet of thermoplastic material (of a second thickness, 3 to 100 times, e.g., 4 to 20 times, the thickness of the first sheet) for formation of the concave surface of the resulting optical lens blank 2. The thick side of a formed lens blank can then be ground to prescription requirements.

Sheet 6 should be a relatively thin sheet having a thickness sufficient to permit the desired incorporation of dyes or other absorbers or additives but not so thick as to increase weight or mass or cause haze. Sheet 6 can, for example, have a thickness of from 3 to 10 mils (0.076 to 3.54mm.). Good results are obtained, for example, using a first relatively thin sheet of about 30 mils thickness (0.76 mm.) and a second thicker sheet having a thickness of about 280 mils (7.10 mm.), i.e., more than nine times the thickness of the first sheet.

Various additives can be included in the photochromic layer 6, or in either or both of light-transmissive sheets 4 and 8. Stabilizers, such as ultraviolet-light absorbers, antioxidants and colorant dyes can be used. Coating or extrusion or casting aids, leveling agents, degassing agents, antistatic agents, dyes and the like may be used. Dyes such as gray, yellow, blue or other dyes can be employed to obtain an optical lens of desired density or color, particularly for ophthalmic applications, even in combination with the photochromics.

Colorant or tint dyes can be incorporated into either of the thermoplastic materials used for production of sheets 4 and 8. Dyes which impart their desired coloration to composite photochromic laminate 2 and to the optical lens blanks produced therefrom will preferably be confined to sheet 4 and 8. In this manner, optical grinding of the thicker layer (8), if needed or performed, and the non-uniform thickness resulting therefrom, will not introduce correspondingly non-uniform coloration and absorbance. Layers (or sheets) 4 and 8 each comprise a polymeric thermoplastic material which can be formed, molded or shaped to a desired curvature under conditions of heat and pressure. An important functional attribute of each of layers 4 and 8 is the provision of durability to the finished lens blank and to the tens prepared therefrom. Preferably layers 4 and 8 will comprise polymeric material capable of providing intrinsically, a measure of durability and scratch resistance. In some instances, it will be beneficial to employ sheet materials 4 and/or 8 that carry or can be provided with a suitable polymeric protective coating. The protective coating will be one which can withstand the conditions of the thermoforming step used in shaping the lens blank, without cracking, delamination or other undesirable failure or blemishing effect.

Lens blanks can be prepared from composite light-polarizing laminate 2 by cutting and removing from a supply of the laminate, unitary portions of a size suited to the production of a desired optical lens. A preferred method of preparing an individual blank to be thermoformed into a lens assures that individual units are cut and removed from the supply, and then provided into individual molds for injection molding of a lens or lamination of a lens to the concave surface of the photochromic element cut from the supply.

In a cutting stage, the thermoformable photochromic laminate 2 is provided with a cut to define the perimeter of an individual unit to be removed from the remainder of the laminate. On cutting completely through the laminate, an individual unit is defined; and upon removal there is provided a thermoformable blank. The cut can be made in a number of ways, including by a rolling knife cutter, reciprocal stamping cutter, a straightedge cutting knife moved translationally along a cut-line, a rotary or swing die traversed along a line or by a laser cutter.

On method of cutting unitary portions from the light-polarizing laminate involves cutting the laminate by directing a laser beam along a cut-line. Sharp and well-defined cut-lines can be obtained in this manner. Good results can be realized using a 500-watt or 1000 watt laser of the C02-type laser (although any laser may be used), having a one-millimeter laser beam diameter. Individual light-polarizing laminar blanks can be thermoformed to lens blanks in a manner described in detail hereinafter. The blanks will, however, be subjected typically to preliminary treatments such as cleaning, grinding or polishing as required. If desired, surface coatings, mold-release agents or other agents can be applied. The blanks can also be preheated to a predetermined temperature (below the temperature of the thermoforming platens) to shorten the time required for the blank to be brought to a thermoforming temperature.

A unitary laminate can be produced, and utilized in various manners. Preferably, a composite structure of finite or endless length can be formed by a continuous or semicontinuous method whereby webs or pieces of the thermoplastic sheet material are adhered to the opposed sides of a photochromic element or layer; and individual blanks are cut to predetermined dimensions suited for the particular forming apparatus employed. The thermoplastic layers may be applied to the photochromic by any convenient process such as, for example, direct lamination, fusion, adhesive bonding, extrusion, coating, and the like. The thermoplastic layers and the composite can be heated and placed immediately, or after substantial cooling, into the forming apparatus.

The forming process for a final article structure (especially an ophthalmic lens) can be carried out by conventional apparatus. The apparatus would include a convex platen, concave platen, means for driving the platens into and out of pressure-applying relationship with each other (pistons, screw pistons, drives, microdrives, clamps, and the like) and means for alternately heating and cooling the platens during each pressure applying interval.

A concave platen could includes a glass member having a smooth concave forming surface, a shaft operatively connected to a suitable drive means, fluid chamber, fluid inlet coupling, and fluid outlet coupling.

The drive means includes, for example, a suitable hydraulic piston and cylinder arrangement operatively connected to a platen for moving the platen into and out of pressure-applying relationship with platen. A heating and cooling means for both the platens could include three-way valve means, heating fluid conduit, cooling fluid conduit, and fluid inlet connecting one of the three way valves to each of fluid inlet couplings and of the platens. A unitary laminar portion is placed in the concave platen so that the relatively thick sheet faces the convex platen, thereby locating the light-polarizing layer relatively near the concave platen. The concave and convex platens are then moved into pressure-applying relationship to form or shape the unitary laminar portion, by the combined effects of pressure and temperature, into a shaped optical lens characterized by concave and convex opposed surfaces. The amount of pressure applied will vary with the particular nature of the composite structure of the laminar portion, and especially the nature of the thermoplastic materials of sheets, and with the temperatures of the forming surfaces of the platens. In the case of a composite comprising a photochromic layer of the preferred type described hereinbefore laminated between sheets of polycarbonate, or polysulfone, pressures in the range of about 100 to 1000 lbs/in$^2$ of lens area (7.0 to 70.3 kg/cm$^2$ of lens area) can be suitably employed. A preferred pressure is about 256 lbs/in$^2$ (about 18.0 kg/cm$^2$).

While pressure is applied to the laminar blank portion, in the manner aforesaid, the platens are heated by passing hot water through chambers of the platens. The surfaces of the platens are continually heated sufficiently to shape the thermoplastic material of sheets 4 and 8 and conform the surfaces of laminar blank 2 to the forming surfaces of the platens. During the forming of a lens blank, conditions of temperature and pressure will be used sufficiently to cause the lens blank to assume the desired shape determined by the platen surfaces and to be annealed, so as to retain its shape and reduce internal stresses that affect photochromic efficiency. Such will be especially important in the case of a polycarbonate lens blank, and to a lesser extent, in the case of acrylic lens blanks.

The method of the present invention can be used for the production of finished lenses which are relatively thick and which have, therefore, the durability associated with such thickness, as well as very thin lenses where manufacturing tolerances may be difficult to meet otherwise. Lenses that vary widely in thickness can be produced. A durable lens having a preferred thickness of from 30 to 400 mils (0.76 to 10.2 mm.) can be produced readily using the method of the invention. Finished lenses can be ground and treated in known manner to provide protective and other functional layers. Antifog layers, metallic layers, polarizing layers, organopolysiloxane and other layers can be applied for their known optical, durability and aesthetic effects. Dip, spin-coating, vacuum deposition and like coating methods can be used, appropriate to the particular coating to be applied.

In the production of a photochromic lens blank of the invention, it will be convenient to utilize a platen having a forming surface that corresponds at least substantially to, and preferably corresponding precisely to, the predetermined curvature of the convex side of the lens to be formed. This permits the convex side of the thermoformed lens blank to have substantially or precisely the refractive power desired in the finished lens and avoids the need to surface or grind the convex side of the lens blank. Although grinding of the convex side will not be precluded, it will be beneficial from a practical standpoint and typical in the case of the inventive lens blanks to select a mold surface appropriate to avoidance of such grinding. It can be appreciated that the convex surface of sheet (formed against a forming surface) may serve as the outer surface of an ophthalmic sunglass lens. The radius of curvature for the surface can vary and can be spherical or aspherical in shape. For the production of a family of lens blanks for ophthalmic lenses, a series of lens blanks can be prepared using platens having various radii of curvature, for example, 2.5, 4, 6 and 9 diopters, respectively, as noted above.

The radius of curvature of each of the platens that form, respectively, the concave and convex surfaces of the lens blank can be determined according to standard ophthalmic procedures. Thus, the radius of curvature ($R^2$) of a surface of a convex platen (which provides the concave lens surface of the lens blank 2) can be calculated by resort to the formula:

$$R^2 = R^1 - t \qquad (I)$$

wherein R' is the radius of curvature of a surface of the concave platen (which provides the convex surface of lens blank 2); and t is the thickness of the blank.

Good results can be obtained by using a concave platen having a surface that provides a base curve within a range of, for example, two to ten diopters; and calculating the radius of curvature ($R^2$) for a surface of the convex platen, as aforedescribed. For example, in the case of a lens blank having a surface of 6.25 diopters, a refractive index of 1.492 and a thickness of 0.137 in. (3.48 mm). The calculated value of $R^1$ (3.099 in; 0.079 m) is then used to calculate, using Formula (I), the radius ($R^2$) of the surface of the convex platen, i.e., a radius of curvature of 2.782 in. (0.071 mm).

The requisite temperature for forming (shaping) the unitary laminar blank 2 will vary with the chemical composition of the thermoplastic sheets 4 and 8. In general, the thermoforming temperature range for materials of, for example, the polycarbonate or polysulfone class will be between 300 degree F and 450 degree F (127° C. to 230° C.), while it will be lower for acrylic materials. Often it will be beneficial to preheat the blank, for example, in the case of polycarbonate sheets, to a temperature of 160° to 250° F. (71-120° C.) for 10 to 30 minutes. Other pretreatments can also be used, depending upon the structural laminate to be thermoformed.

The temperature of the forming surfaces of the platens can be controlled by the passage of heated water and cooled water, electronically, or the like, as described previously. The platens preferably will be preheated, i.e., prior to placement of the unitary laminar blank 2 there between, and will be heated to the requisite forming temperature for a heating cycle sufficient to provide the desired shaped lens. For example, the forming surfaces of the platens can be preheated to about 100-400° F. (38-204° C.) in the case of polycarbonate or polysulfone thermoplastic materials, in advance of placing the composite laminate into the mold and closing the mold within about 5 to 30 seconds. The mold surfaces are then heated to the requisite forming temperature by the passage of heated water through the platens and temperature is maintained for a duration (e.g., 60 to 240 seconds) sufficient to effect desired lens formation. Thereafter, the temperature of the platen surfaces is reduced by passage of a cooling fluid, such as relatively cool water, through chambers in the platens. The cooling fluid is passed through the platens for an effective duration, e.g., for about 30 seconds.

In order to obtain desired results, the mold temperature during the injection of molten polycarbonate is in the range of 270 to 290 degrees F. It has been determined by the inventors that temperatures below this range will result in cosmetic defects and will lead to unacceptable changes in curvature after finishing the molded lens blank into a lens. It has been further determined by the inventors that temperatures above this range will result in inconsistent quality and uneconomical molding conditions. This temperature range is also found to be important for ensuring the manufacture of a lens blank that is as clear as possible.

Hot water is supplied to the platens may be provided through conduits and the relatively cool water is supplied through other conduits. During the heating cycle, a valve may open a connecting passage between some conduits and close other conduit(s). The system would operate in an opposite manner during the cooling cycle, with the valve opening a connecting passage between certain conduits and closes another conduit. The transition from the heating cycle to the cooling cycle is carried out by operating valves to mix cool water with the hot water until the hot water is completely displaced by cool water. Transition from cooling cycle to heating is carried out by reversing the operation.

When molding a stepped multifocal lens or lens blank, there is at least one segment of the mold that leads to the formation of the power addition on the lens. It has been determined by the inventors that improved quality of such a lens can be obtained by constructing the mold such that the gate for introducing molten polycarbonate into the mold is located as far as practicable from the segment that forms the power addition. It has been further determined that the gate should be positioned so that the straight edge of the segment encounters the molten polycarbonate before the remainder of the segment thus allowing the polycarbonate to "drop off" the edge and flow better to the remaining rounded portion of the segment. This will result in a high quality lens wherein the segment has a distinct edge.

When molding a progressive multifocal lens or lens blank, there is a blended area on the mold that forms on the molded lens a progressively higher curvature radially outward from the central part of the lens. This is typically called an add corridor and optimal formation of this corridor will yield a high quality lens. It has been determined by the inventors that optimal formation of this corridor occurs when the mold is constructed to have the gate directly adjacent to the portion of the mold that forms this corridor. Such a gate placement ensures that the molten polycarbonate moves directly down this corridor during molding of the lens.

When molding a lens having a base curve of 4 Diopters or higher, it has been determined by the inventors that it is optimal to preform the laminar blank 2 prior to molding of the lens or lens blank. In particular, it has been determined that the blank should be pre-formed so that it has a shape shallower than the mold cavity for the 4 diopter or higher lens but not to be a flat shape. In other words, the laminar blank 2 or film needs to be shallower than the lens ultimately produced by the lens but not a flat shape. This will reduce defects and is more economical than other approaches.

It has also been determined that preconditioning the laminar blank 2 or film reduces defects in the molded lens. In particular, it has been determined that subjecting the film to one of preheat, vacuum or desiccation or any combination of them, reduces defects in the molded lens.

After the cooling operation, platens are separated to relieve the pressure on laminar blank 2 and permit its removal. The laminar blank may adhere to one of the platens, from which it may be removed by a stream of compressed air supplied by an air nozzle, or by physical means.

Polyesterurethanes comprise a well-establish class of polymers, well known in the art. For example, polyesterurethanes having terminal allyl and/or acrylyl functional groups, as described in U.S. Pat. Nos. 4,360,653, 4,994,208, and 5,200,483 are within the scope of the present invention. Polyesterurethanes such as those shown in 5,290,848 are, also within the scope of the present invention. Most polyesterurethanes are formed by the reaction of polyols, usually diols, and most preferably linear, branched, cyclic or aromatic diols with isocyanates, usually diisocyanates, such as by reacting organic isocyanates with polyols to form polyurethanes. Such isocyantes, by way of non-limiting examples are hexamethylene diisocyanate, bis (4-isocyanato cylclohexyl) methane, trimethyl hexamethylene diisocyanate, toluene diisocyanate, diphenylmethane diisocyanate, the isocyanurate trimer of hexamethylene diisocyanate and the biuret trimer of hexamethylene diisocyanate. When forming the polyurethate, the stoichiometric amount of isocyanate used should be such that the resulting polyurethane has at least two reactive hydroxyl groups per polymer molecule.

The following examples illustrate the invention but is not to be taken as limiting the 30 inventions.

EXAMPLES

To obtain meaningful numbers for data on the performance of photochromic laminates on polycarbonate surfaces, a controlled experiment was done to measure the amounts of degradation obtained after an accelerated fatigue test on samples placed in a xenon lamp fadometer. The urethane polymers selected for comparison were both potyester urethanes (e.g., polyesters derived from polyester polyols or diols), herein called resin "A" (CLC-93A, Thermedics Corp, Woburn, Mass.), and polyether urethanes (derived from polyether polyols or diols), herein called resin "B" (PT-7500, Deerfield Urethane, Deerheld, Mass.).

Two test formulations were prepared, one with each of the two polymer types, resin A and resin B, Polyester and Polyether, respectively. Both formulations had the same weight proportions of the combination of ingredients consisting of CR49 0.66%, CR59 0.10%, Uvinul® 0.30%, Tinuvin® 144 2.00%, Tinuvin.F 765 2.00%, the urethane solids composed the remainder up to 100% solids, all values being expressions of weight %. CR49 and CR-59 are photochromic dyes (Corning Corp.). Uvinul® 3040 (BASF) and the Tinuvins® (CIBA) are UV absorbers and stabilizers.

The respective polymers were dissolved in THF (tetrahydrofuran) before the other components were added. Type resin A was made up with 27% wt solution in THF. Type B was made up as 16.2% wt solution to obtain similar viscosities.

After the two resin solutions were property dissolved, they were poured onto a sheet of class at room temperature, spread out to a uniform thickness with a Gardner knife and then allowed to dry overnight. After the two films were dry, each film was cut into two pieces. One piece of each formulation was left bare and one piece was laminated between two sheets of clear polycarbonate. The polycarbonate sheets were each 0.25 mm thick (0.010 inch). Each of these four samples was then cut in half, one portion of each was retained as made and the other portion used for the fatigue testing. The test pieces were mounted over a 25 mm diameter hole in 2×3 inch cards and identifying information printed on each card. The test specimens were designated as AF, AL, BF and BL. In the data, the A and B refer to the polymer types, A for ester and B for ether; F for bare films and L for the laminated specimens.

The spectral properties of each of the four test pieces were measured twice. The first measurement was taken before activation (unactivated state). The second measurement was taken after activation by UV from a Xenon Lamp. Bare films were activated for 5 minutes and the laminates were activated for 15 minutes with a xenon lamp simulating natural sunlight immediately before measuring the activated spectral responses with a Hunter colorimeter model Ultra Scan XE.

The four test specimens were then placed in a xenon lamp fadometer (different from the activator lamp) for 24 hours of continuous exposure with simulated sunlight. The output of the xenon lamp was set to produce 30 watts per square of UV light measured with a detector that integrates the UV spectrum from 300 to 400 nm. The specimens were then placed in an oven at 60° C. for at least one hour to accelerate the fade reaction so the unactivated color spectra could be measured. Unactivated spectra and then activated spectra were measured for each test piece the same way as before.

Spectral measurements were made at zero hours and after 24, 48, 96 and 144 hours of fadometer exposure. 144 hours of exposure is deemed to be equivalent to 2 years of normal outdoor wear of a pair of spectacles by an active person. A summary of the data is presented in the attached table.

Fatigue may be measured in several ways. Here we define it as a permanent loss of activation range after extended exposure to simulated sunlight. From the data in the table, it may be seen that the polyether type (B) film fatigues significantly more quickly than the polyester type (A) film and that the same holds true for the two laminated films. Lamination significantly helps to reduce fatigue for both types of urethane photochromics as compared to non-laminated films.

The film was placed, between polycarbonate flat 10 mil (0.25 mm) thick pieces, heated and pressed at about 180-200° F.

The B type laminate lost 44.6% of its initial photochromic activity, while the A type lost only 8.7% of its initial photochromic activity under the same conditions. Thus the polyester type is much superior.

TABLE

| polyurethane type specimen conformation | ester film | ether film | ester laminate | ether laminate | ester film | ether film | ester laminate | ether laminate |
|---|---|---|---|---|---|---|---|---|
| Urethane film portion thickness, mm | 0.178 | 0.186 | 0.191 | 0.190 | 0.178 | 0.186 | 0.191 | 0.190 |
| Fatigue fadometer hours | 0 | 0 | 0 | 0 | 144 | 144 | 144 | 144 |
| Unactivated Luminous Transmission % T | 86.2 | 83.7 | 84.4 | 82.4 | 79.4 | 77.1 | 82.1 | 82.4 |
| Loss of unactivated Luminous Transmittance | 0 | 0 | 0 | 0 | 6.8 | 6.6 | 2.3 | 0 |
| Xenon Lamp 15 min Activated Luminous Transmission at 72° F. | 6.3 | 17.3 | 7.4 | 13.6 | 20.5 | 56.4 | 11.8 (Darker) | 44.3 |
| Activation range Luminous Transmission | 79.9 | 66.4 | 77.0 | 68.8 | 58.9 | 20.7 | 70.3 | 38.1 |
| Loss of activation Transmission range | 0 | 0 | 0 | 0 | 26.3 | 68.8 | 8.7 | 44.6 |

As can be seen from the data, there was significant performance improvements using the polyester urethane as compared to the use of the polyether urethane as the carrying medium for the photochromic material. There was far more improvement than trade-off loss, such as the 2.3% loss of unactivated luminous transfer for the polyester urethane (as compared to 0% loss for the polyether urethane) and 82.1% to 82.4% unactivated luminous transmission as compared to the 8.7% loss for the polyester urethane for loss of activation percent transmission range (as compared to 44.6% loss for the polyether urethane) and the Xenon lamp activated transmission of 11.8 (darker, as this is transmission being measured) as compared to 44.3% transmission for the polyether urethane.

The invention claimed is:

1. A multifocal ophthalmic lens blank comprising:
a lens body comprising a thermoplastic resin;
said lens body having an add corridor substantially free of cosmetic defects as a result of minimizing a length of a flow path of a molten thermoplastic resin injected into a lens mold to a portion of said lens mold that forms said add corridor of said lens body; and
a functional laminate molded to said lens body, wherein said functional laminate comprises a polyester urethane binder.

2. A multifocal ophthalmic lens blank according to claim 1, wherein said functional laminate is a photochromic laminate.

3. A multifocal ophthalmic lens blank according to claim 1, wherein said functional laminate is a polarizing laminate.

4. A multifocal ophthalmic lens blank according to claim 1, wherein said functional laminate is preconditioned with at least one of the pretreatments selected from the group of pretreatments consisting of: heat, vacuum and desiccation.

5. A multifocal ophthalmic lens blank according to claim 1, wherein said functional laminate has a curvature flatter than a curvature of a lens blank of at least 4 diopter.

6. An ophthalmic lens blank according to claim 1, wherein said thermoplastic resin is a polycarbonate.

7. An ophthalmic lens blank according to claim 1, wherein said thermoplastic resin is a polysulfone.

8. An ophthalmic lens blank according to claim 1, wherein said lens body has a dimensional stability derived from having been cooled from a mold temperature in the range of approximately 270 to 290 degrees Fahrenheit.

9. A multifocal ophthalmic lens blank comprising:
a lens body comprising a thermoplastic resin;
said lens body having a stepped power portion;
said stepped power portion having a straight edge with a straightness derived from a molten thermoplastic resin dropping off an edge of a portion of a lens mold that forms said stepped power portion of said lens body before said molten thermoplastic resin contacts a remaining area of said lens mold that forms said stepped power portion of said lens body; and
a functional laminate molded to said lens body, wherein said functional laminate comprises a polyester urethane binder.

10. A multifocal ophthalmic lens blank according to claim 9, wherein said functional laminate is a photochromic laminate.

11. A multifocal ophthalmic lens blank according to claim 9, wherein said functional laminate is a polarizing laminate.

12. A multifocal ophthalmic lens blank according to claim 9, wherein said functional laminate is preconditioned with at least one of the pretreatments selected from the group of pretreatments consisting of: heat, vacuum and desiccation.

13. A multifocal ophthalmic lens blank according to claim 9, wherein said functional laminate has a curvature flatter than a curvature of a lens blank of at least 4 diopter.

14. A multifocal ophthalmic lens blank according to claim 9, wherein said thermoplastic resin is a polycarbonate.

15. A multifocal ophthalmic lens blank according to claim 9, wherein said thermoplastic resin is a polysulfone.

16. A multifocal ophthalmic lens blank according to claim 11, wherein said lens body has a quality derived from having been cooled from a mold temperature in a range of approximately 270 to 290 degrees Fahrenheit.

* * * * *